(12) United States Patent
Junior et al.

(10) Patent No.: US 11,055,066 B2
(45) Date of Patent: Jul. 6, 2021

(54) MULTI-CLOUD OPERATIONS CENTER FOR FUNCTION-BASED APPLICATIONS

(71) Applicant: EMC IP Holding Company LLC, Hopkinton, MA (US)

(72) Inventors: Jaumir Valença Da Silveira Junior, Rio de Janeiro (BR); Ruixue Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/554,903

(22) Filed: Aug. 29, 2019

(65) Prior Publication Data

US 2021/0064347 A1 Mar. 4, 2021

(51) Int. Cl.
  *G06F 9/445* (2018.01)
  *G06F 8/30* (2018.01)
  *G06F 8/60* (2018.01)

(52) U.S. Cl.
  CPC . *G06F 8/30* (2013.01); *G06F 8/60* (2013.01)

(58) Field of Classification Search
  CPC .................................. G06F 8/30; G06F 8/60
  USPC ................................................ 717/106, 177
  See application file for complete search history.

(56) References Cited

U.S. PATENT DOCUMENTS

| | | | |
|---|---|---|---|
| 8,417,938 B1* | 4/2013 | Considine | G06F 9/5088 713/151 |
| 9,229,771 B2* | 1/2016 | Armour | G06F 9/4843 |
| 9,608,931 B2* | 3/2017 | Sharma | H04L 47/70 |
| 9,648,134 B2* | 5/2017 | Frank | H04L 67/34 |
| 9,692,632 B2* | 6/2017 | Bhattacharya | G06F 9/5072 |
| 9,871,851 B2* | 1/2018 | Todd | H04L 67/10 |
| 10,129,177 B2* | 11/2018 | Chang | H04L 12/66 |
| 10,198,250 B1 | 2/2019 | Sharma et al. | |
| 10,198,447 B2* | 2/2019 | Goswami | G06F 11/0709 |
| 10,379,910 B2* | 8/2019 | Balasubramanian | G06F 9/5072 |
| 10,560,345 B2* | 2/2020 | Patel | G06F 8/60 |

(Continued)

OTHER PUBLICATIONS

Josef Spillner; "Quantitative Analysis of Cloud Function Evolution in the AWS Serverless Application Repository"; Zurich University of Applied Sciences, Service Prototyping Lab, Switzerland—May 14, 2019.*

(Continued)

*Primary Examiner* — Francisco J Aponte
(74) *Attorney, Agent, or Firm* — Ryan, Mason & Lewis, LLP

(57) ABSTRACT

Techniques are provided for a multi-cloud operations center for function-based applications. One method includes obtaining source code for a function of multiple functions of an application, where the function is hosted in a first cloud environment of multiple distinct cloud environments, generating adapted source code from the source code to migrate the function to a second cloud having a different cloud environment; and deploying the function to the second cloud having the different cloud environment using the adapted source code. The source code may be automatically updated for the at least one function for the multiple distinct cloud environments. The function may have a corresponding network address that identifies the function across multiple distinct cloud environments, and network address redirection is performed based on a given cloud environment on which the function is deployed.

20 Claims, 10 Drawing Sheets

(56) References Cited

U.S. PATENT DOCUMENTS

| | | | |
|---|---|---|---|
| 2013/0212553 A1* | 8/2013 | Balasubramanian | G06F 8/51 717/102 |
| 2014/0156813 A1* | 6/2014 | Zheng | H04L 67/34 709/220 |
| 2014/0282456 A1* | 9/2014 | Drost | G06F 8/76 717/158 |
| 2015/0263894 A1* | 9/2015 | Kasturi | G06F 9/4856 709/222 |
| 2017/0201569 A1* | 7/2017 | Fu | G06F 9/45558 |
| 2017/0244593 A1 | 8/2017 | Rangasamy et al. | |
| 2017/0257432 A1 | 9/2017 | Fu et al. | |
| 2018/0081740 A1* | 3/2018 | Syed | G06F 8/76 |
| 2018/0103064 A1 | 4/2018 | Ahuja et al. | |
| 2018/0196655 A1* | 7/2018 | Kapoor | G06F 8/62 |
| 2018/0241642 A1 | 8/2018 | Patel et al. | |
| 2018/0260301 A1 | 9/2018 | Podjarny et al. | |
| 2018/0270122 A1 | 9/2018 | Brown et al. | |
| 2018/0285353 A1* | 10/2018 | Ramohalli Gopala Rao | G06F 9/45558 |
| 2018/0302335 A1 | 10/2018 | Gao et al. | |
| 2018/0324119 A1 | 11/2018 | Ahuja et al. | |
| 2018/0324204 A1 | 11/2018 | McClory et al. | |
| 2019/0034181 A1* | 1/2019 | Kapoor | G06F 8/62 |
| 2019/0235852 A1* | 8/2019 | Bartolotta | G06F 8/71 |
| 2019/0306236 A1* | 10/2019 | Wiener | H04L 67/1095 |
| 2020/0034192 A1* | 1/2020 | Kandula | G06F 9/546 |
| 2020/0036785 A1* | 1/2020 | Kandula | H04L 41/0813 |
| 2020/0089515 A1* | 3/2020 | Hari | H04L 41/0813 |
| 2020/0133738 A1* | 4/2020 | Junior | H04L 47/826 |
| 2020/0210218 A1* | 7/2020 | Lu | G06F 9/5077 |
| 2020/0244772 A1* | 7/2020 | Luo | H04L 67/34 |
| 2020/0257567 A1* | 8/2020 | Fontanari Filho | G06F 16/901 |
| 2020/0272556 A1 | 8/2020 | Podjarny et al. | |
| 2020/0382591 A1* | 12/2020 | Becker | H04L 43/16 |
| 2021/0099459 A1* | 4/2021 | Zhang | H04L 63/105 |

OTHER PUBLICATIONS

U.S. Appl. No. 16/171,554 entitled, "Multi-Cloud Framework for Microservice-Based Applications", filed Oct. 26, 2018.
U.S. Appl. No. 16/587,716 entitled, "Serverless Application Center for Multi-Cloud Deployment of Serverless Applications", filed Aug. 29, 2019.
"Microservices", downloaded from https://en.wikipedia.org/wiki/Microservices on Oct. 25, 2018.
"Application programming interface", downloaded from https://en.wikipedia.org/wiki/Application_programming_interface on Oct. 25, 2018.
Junod, Betty, "Container as a Service (CaaS) as your New Platform for Application Development and Operations" downloaded from CaaS: https://blog.docker.com/2016/02/containers-as-a-service-caas/ on Oct. 25, 2018.
"Microsoft Azure", downloaded from https://en.wikipedia.org/wiki/Microsoft_Azure on Oct. 25, 2018.
"Google Cloud Platform", downloaded from https://en.wikipedia.org/wiki/Google_Cloud_Plafform on Oct. 25, 2018.
"Pivotal Web Services", downloaded from https://run.pivotal.io/ on Oct. 25, 2018.
"Cron", downloaded from https://en.wikipedia.org/wiki/Cron on Oct. 25, 2018.
https://en.wikipedia.org/wiki/Function_as_a_service, downloaded Aug. 14, 2019.
https://docs.microsoft.com/en-us/azure/azure-functions/, downloaded Aug. 14, 2019.
https://cloud.google.com/functions/, downloaded Aug. 14, 2019.
https://en.wikipedia.org/wiki/Continuous_integration, downloaded Aug. 14, 2019.
https://en.wikipedia.org/wiki/Continuous_deployment, downloaded Aug. 14, 2019.
https://cloud.google.com/functions/docs/writing/http, downloaded Aug. 14, 2019.
https://docs.microsoft.com/en-us/azure/azure-functions/functions-bindings-http-webhook, downloaded Aug. 14, 2019.
https://www.unigma.com/, downloaded Aug. 15, 2019.
https://www.rightscale.com/, downloaded Aug. 15, 2019.
https://www.cloudcruiser.com/, downloaded Aug. 15, 2019.
https://searchvmware.techtarget.com/definition/VMware-VirtualCenter, downloaded Aug. 15, 2019.
https://www.ibm.com/support/knowledgecenter/en/SSBS6K_3.1.0/mcm/getting_started/introduction.html, downloaded Aug. 15, 2019.
https://kubernetes.io, downloaded Aug. 15, 2019.
https://en.wikipedia.org/wiki/Infrastructure_as_a_service, downloaded Aug. 15, 2019.
https://en.wikipedia.org/wiki/URL_redirection, downloaded Aug. 15, 2019.
https://en.wikipedia.org/wiki/Google_Storage, downloaded Aug. 15, 2019.
https://en.wikipedia.org/wiki/Microsoft_Azure#Storage_services, downloaded Aug. 15, 2019.
https://en.wikipedia.org/wiki/Object-oriented_programming, downloaded Aug. 15, 2019.
https://en.wikipedia.org/wiki/Class_(computer_programming)#Abstract_and_concrete, downloaded Aug. 15, 2019.
https://docs.microsoft.com/en-us/dotnet/csharp/programming-guide/delegates/, downloaded Aug. 15, 2019.
https://docs.microsoft.com/en-us/rest/api/billing, downloaded Aug. 15, 2019.
https://cloud.google.com/billing/reference/rest/, downloaded Aug. 15, 2019.
https://en.wikipedia.org/wiki/Syntax_(programming_languages), downloaded Aug. 15, 2019.
https://en.wikipedia.org/wiki/Regular_expression, downloaded Aug. 19, 2019.
https://en.wikipedia.org/wiki/Source-to-source_compiler, downloaded Aug. 19, 2019.
https://en.wikipedia.org/wiki/GitHub, downloaded Aug. 19, 2019.
https://en.wikipedia.org/wiki/Create,_read,_update_and_delete, downloaded Aug. 19, 2019.
https://www.icann.org/, downloaded Aug. 15, 2019.
https://developer.mozilla.org/en-US/docs/Glossary/Signature/Function, downloaded Aug. 15, 2019.
https://developer.mozilla.org/en-US/docs/Learn/JavaScript/Building_blocks/Return_values, downloaded Aug. 15, 2019.
VMware, Introduction to vRealize Suite, available at https://docs.vmware.com/en/vRealize-Suite/2018/com.vmware.vrealizesuite.overview.doc/GUID-E35A076A-D12B-4477-BE11-9E35E9389ACA.html, last updated on May 31, 2019.
"Function as a Service", downloaded from https://en.wikipedia.org/wiki/Function_as_a_service downloaded on Oct. 25, 2018.
"Unified Cloud Management", downloaded from https://www.unigma.com/, downloaded on Oct. 25, 2018.
"RightScale Cloud Management", downloaded from https://www.rightscale.com/, downloaded on Oct. 25, 2018.
"Cloud Cruiser: Cloud Cost Management—Cloud Spending", https://www.cloudcruiser.com/, downloaded on Oct. 25, 2018.
"Object-oriented-programming", downloaded from https://en.wikipedia.org/wiki/Object-oriented-programming downloaded on Oct. 25, 2018.
DiNitto et al., "Model-Driven Development and Operation of Multi-Cloud Applications, The MODA Clouds Approach" https://www.modaclouds.eu/, downloaded on Oct. 19, 2018.

* cited by examiner

```
{"AppRegistration": {
    "Client id": "123456",
    "AppName": "SuperApp",
    "LanguageRuntime": "nodejs8",
    "Origin Path": "https://github.fake.dell.com/fake/MyApplication.git"
    "Functions": [
        {"Name": "SuperFunc1", "Type": "Http", "Params":""},
        {"Name", "SuperFunc2", "Type": "Timer", "Params":"*/5 * * * "},
        {"Name", "SuperFunc3", "Type": "Storage", Params: "connection Params"}
    ]
}}
```

| CLOUD SUBSCRIPTION | FUNCTION | DATE | USAGE | COST |
|---|---|---|---|---|
| Azure1 | Func1 | 20.02.02 | 15 min | $0.01 |
| Azure2 | Func2 | 20.02.02 | 30 min | $0.02 |
| CGP 1 | FuncA | 20.02.02 | 1h | $0.10 |
| GCP 1 | FuncB | 20.02.02 | 2h | $0.20 |

FIG. 9

```
var azStorage = require("azure-storage")
var connString = "xxxxxx"

module.exports.GetValuesNodeJs = async function(req, res) {    ← 910 var resReturn = "--"
    var resCode = 500
    var queueSvc = azStorage.createQueueService(connString);
    queueSvc.messsageEncoder = new azStorage.QueueMessageEncoder.
    TextBase64QueueMessageEncoder () ;

function doesQueueExistWaitable ()
    {
        return new Promise ( (resolve, reject) => {
            queueSvc.doesQueueExist ('latestdraw', function (e, r) {
                . . .
                . . .
                . . .
            }}
        }}
    }
    await doesQueueExistWaitable ()          920
    res.status(resCode) .send(resReturn)    ←
}
```

*FIG. 10*

```
var azStorage = require("azure-storage")
var connString = "xxxxxx"

module.exports = async function (context, req) {    // 1010 var resReturn = "--"
    var resCode = 500
    var queueSvc = azStorage.createQueueService(connString);
    queueSvc.messsageEncoder = new azStorage.QueueMessageEncoder.
    TextBase64QueueMessageEncoder () ;

function doesQueueExistWaitable ()
    {
        return new Promise ( (resolve, reject) => {
            queueSvc.doesQueueExist ('latestdraw', function (e, r) {
                . . .
                . . .
                . . .
            }}
        }}
    }
    await doesQueueExistWaitable ()
    context.bindings.httpResponse = status: resCode, body: resR    // 1020
}
```

```
{
    "disabled": false,
    "bindings": [
        {
            "authLevel": "anonymous",
            "type": "httpTrigger",
            "direction": "in",
            "name": "req",
            "methods": [
                "get",
                "post"
            ]
        },
        {
            "type": "http",
            "direction": "out",
            "name": "httpResponse"
        }
    ]
}
```

MULTI-CLOUD OPERATIONS CENTER FOR FUNCTION-BASED APPLICATIONS

FIELD

The field relates generally to the deployment of software applications.

BACKGROUND

Software applications are increasingly deployed as a collection of functions. In addition, a number of software providers are increasingly using multiple cloud environments to host their applications and/or data. A need remains for improved techniques for deploying function-based applications across multiple cloud environments.

SUMMARY

In one embodiment, a method comprises obtaining first source code for at least one function of a plurality of functions of an application, wherein the at least one function is deployed in a first cloud having a first cloud environment of a plurality of distinct cloud environments, generating adapted source code from the first source code for the at least one function to migrate the at least one function to a second cloud having a different cloud environment than the first cloud environment; and deploying the at least one function to the second cloud having the different cloud environment using the adapted source code.

In some embodiments, a cloud-specific configuration file can also be generated for the at least one function to migrate the at least one function to the different cloud environment. The first source code may be automatically updated for the at least one function for the plurality of the distinct cloud environments.

In one or more embodiments, the at least one function has a corresponding network address that identifies the at least one function across a plurality of the distinct cloud environments, and further comprises performing a network address redirection of the corresponding network address based on a given cloud environment on which the at least one function is currently deployed. The network address redirection can be updated each time the at least one function is migrated to a new cloud environment.

Other illustrative embodiments include, without limitation, apparatus, systems, methods and computer program products comprising processor-readable storage media.

BRIEF DESCRIPTION OF THE DRAWINGS

FIG. 3 illustrates an exemplary application registration request sent by a developer to the deployer 140 of FIG. 1, according to at least one embodiment;

FIGS. 9 and 10 illustrate an exemplary function written in a node JS format for two different exemplary cloud environments, according to one or more embodiments of the disclosure;

DETAILED DESCRIPTION

Figure 1:
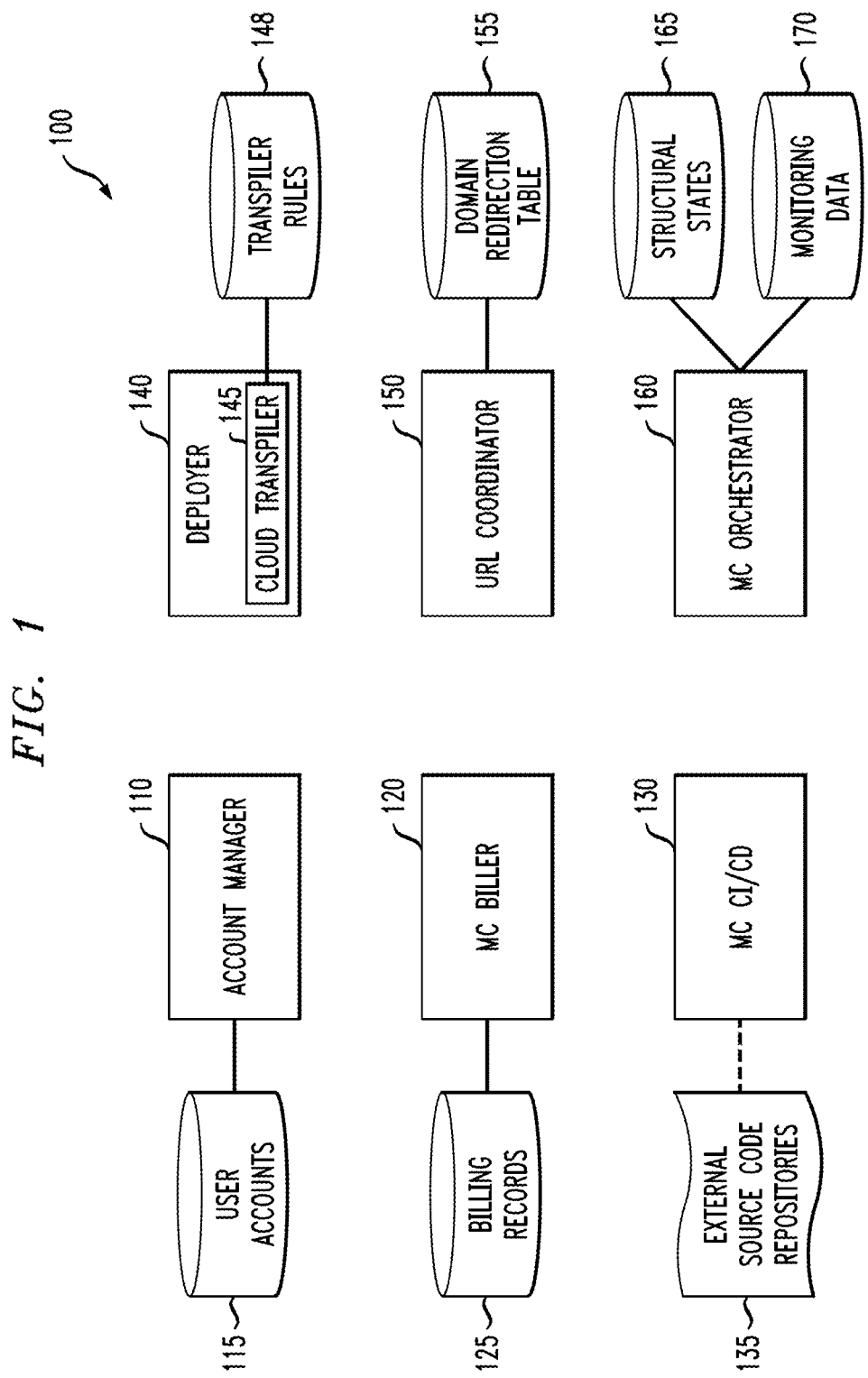
FIG. 1 illustrates an exemplary architecture for a multi-cloud operations center, according to at least one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide a multi-cloud operations center for function-based applications.

In one or more embodiments, an operations center tailored for multi-cloud function-based applications is provided. Generally, function-based applications are created by software developers as a composition of code fragments corresponding to individual functions that work together to realize the functionalities of an application. An application of this kind is typically deployed in a cloud that offers a Function-as-a-Service (FaaS) environment, such as Azure Functions from Microsoft Corp., or Google Cloud Functions from Google Inc.

U.S. patent application Ser. No. 16/171,554, filed Oct. 26, 2018, entitled "Multi-Cloud Framework for Microservice-Based Applications," incorporated by reference herein in its entirety, describes techniques for deploying microservice-based applications across multiple cloud environments. A software Application Programming Interface (API) is provided that allows a developer to deploy a function-based application to multiple clouds, as well as to migrate functions among clouds, in a manner that he or she could, virtually at any moment, track down which functions of which applications were running on which clouds.

One or more embodiments of the present disclosure provide an end-to-end product, referred to in some embodiments as a Multi-Cloud Operations Center, comprising, for example, a software architecture running on a server machine that acts a service provider, to be used by developers that want to deploy their function-based applications and benefit from multi-cloud technologies, but without the burden of having to deal directly with multiple clouds, multiple cloud accounts and/or multiple cloud URLs (Uniform Resource Locators) (or another form of a network address).

Among other benefits, the disclosed Multi-Cloud Operations Center provides one or more of the following benefits to developers and others:

a single user account and a single billing system, even though the functions can be deployed to multiple clouds;

automatic redirection of URLs for web service functions during function migration among clouds;

Cloud-Aware Continuous Integration (CI) and Continuous Deployment (CD); and/or a single codebase for different cloud environments.

Consider that a developer has an application written to be deployed according to a modern FaaS paradigm: an application is a set of functions that can be run, deployed and tested separately in some Cloud environment. The developer can choose one Public Cloud to deploy his or her application and, once deployed, the cloud provider sends regular bills related to resource consumption.

Service prices offered by cloud providers, however, are often dynamic and can change frequently. Thus, a developer may query whether his or her functions are always running on the most cost-effective cloud. A developer may desire to be able to automatically move functions among clouds with minimal effort (e.g., with little, if any, human intervention and/or with little, if any, need to have multiple account subscriptions for different clouds).

Moreover, if some functions of the application are web services (e.g., services that communicate with remote end users via HTTP) that experience regional traffic congestions, it would be nice to be able to easily move these functions to clouds in other regions, again with little, if any, human intervention.

To address the needs of deploying, optimizing and/or monetizing modern function-based applications in multi-cloud environments, an architecture is disclosed for a multi-cloud operations center e.g., a software system in some embodiments that runs on a server machine and removes the burden from developers of managing multiple clouds in order to harness the benefits from multi-cloud environments).

System Users

In at least one embodiment, the disclosed system is designed to operate with two types of users: an administrator, who is responsible for setting up and maintain the system, and developers, that effectively create function-based applications to be deployed to public clouds. The responsibilities of the administrator and the developers in the disclosed system are discussed further below in the following sections.

End users are outside the scope of the disclosed system. End users are users that will actually utilize the applications created by the developers. Applications created by developers can be any kind of applications supported by Cloud FaaS environments, from one-page websites to complex applications whose functions are distributed among various geographic regions. End users do not interact with the disclosed system components, at least in some embodiments; instead, end users will use cloud-deployed functions by means of URLs provided by the system. These URLs provided by the system will redirect users to real cloud-native-provided URLs, making the multi-cloud experience transparent to users.

Administrator

In one or more embodiments, the administrator has the following responsibilities:

act as a broker for developers, by creating subscriptions (e.g., accounts) for each Cloud that takes part in the multi-cloud environment (e.g., Azure and/or GCP (Google Cloud Platform)). The disclosed system will use these accounts to deploy, update and/or delete functions created by developers to the clouds, so the developers in some embodiments will not need to create any cloud subscriptions themselves;

setting up the disclosed system in a server machine and maintaining its operation;

maintaining a list of registered DNS (Domain Name System) domains and a table of domain redirections within a global DNS (this mechanism of domain redirection will allow for seamless migration of HTTP-based functions among clouds, allowing end users to work with fixed URLs, as discussed further below).

Developers

Developers may want their applications published to several clouds without the burden of registering with various clouds and dealing with them, nor do developers typically want to deal with several billing statements. Developer interactions with the disclosed system in some embodiments include, for example:

create and/or delete a unique user account in the system, providing personal and billing information;

register and/or de-register applications, providing the address of a source code repository for each application;

initiate application deployment and activate/deactivate CI/CD; and receive notifications about application usage and bills related to it.

Operations Center

One or more embodiments of the disclosure provide an end-to-end software system that allows developers that work with FaaS technologies to take advantage of a multi-cloud environment. Generally, in at least one embodiment, an exemplary flow of operations of the disclosed system follows:

system administrator configures the system for use;

developer creates an account within the system;

developer registers applications;

system deploys application/functions to clouds;

system monitors functions usage and migrates functions among clouds according to pre-established optimization criteria;

system performs application CI/CD, if activated;

system emits service bills to administrator and developers; and system administrator cancels user accounts if necessary.

FIG. 1 illustrates an exemplary architecture for a multi-cloud operations center 100, according to at least one embodiment of the disclosure. As shown in FIG. 1, the exemplary multi-cloud operations center 100 is comprised of the following software components: an account manager 110, a multi-cloud biller 120, a multi-cloud CI/CD 130, a deployer 140 comprising a cloud transpiler 145, a URL coordinator 150 and a multi-cloud orchestrator 160. Together, these components in FIG. 1 work as an integrated solution, in some embodiments, that encompasses a full embodiment of a Multi-Cloud FaaS provider (e.g., an MCFaaS). The components of FIG. 1 are briefly described below.

In the example of FIG. 1, the account manager 110 creates developer accounts and maintains a user accounts database 115 for these accounts. The user accounts database 115 stores identification information that allows the developers to use the system. Each developer that wants to deploy an application via the multi-cloud operations center 100 needs to create a user account in the user accounts database 115. This user account serves to identify and authorize each user for subsequent operations.

In one or more embodiments, the account manager 110 uses an internal HTTP Listener to register developer accounts via HTTP and maintains the user accounts database 115 to store these accounts. Each record in the exemplary user accounts database 115 comprises one or more of the following:
name;
user credentials to the system (e.g., encrypted password);
address;
e-mail address; and/or
credit account information.

The account manager 110 creates, deletes and/or updates developer accounts. Other components use the user accounts database 115 to validate a user request (e.g., whether or not that user exists in the user accounts database 115 and whether the user is authorized to perform operations such as code deployment).

The multi-cloud biller 120 is responsible for the following exemplary tasks:
internal billing: provide the system administrator with automated, detailed information about how much each function/each cloud is costing the system;
developer billing: provide monthly bills to developers that deploy applications to the system. The developer billing builds on internal billing, but consolidates the costs per application (cost of its functions during the month), applies administrations fees, and sends detailed bills for each application; and
payment system: interfaces with commercial companies that deal with payment systems (e.g., credit card companies) to track whether bills are being paid or not.

The multi-cloud biller 120 maintains a billing records database 125 comprising the gathered information related to functions usage and its costs.

In some embodiments, the multi-cloud CI/CD 130 incorporates continuous integration and continuous deployment techniques to the multi-cloud operations center 100, extending CI/CD concepts to a multi-cloud environment using one or more external source code repositories 135. Since the functions that are part of an application can be scattered among different clouds, the multi-cloud CI/CD 130 must be able, in at least some embodiments, to add, delete or update functions precisely in the clouds that host the functions, and the multi-cloud CI/CD component 130 works in conjunction with the multi-cloud orchestrator 160 to make it happen.

As noted above, the exemplary deployer 140 comprises a cloud transpiler 145. The deployer 140 accepts application registrations from developers, validates them and coordinates the deployment of these applications with the multi-cloud orchestrator 160. The cloud transpiler 145 is responsible for creating configuration files for different types of services and different types of clouds, using predefined transpiler rules 148. The generated configuration files will be deployed along with the source code by the multi-cloud orchestrator 160. This mechanism allows for the source code of functions to be written only once by developers and to be deployed to and by multiple clouds.

The URL coordinator 150 plays an important role in one or more embodiments to make HTTP-triggered function migration seamless to end users. When an application is initially deployed, each of its HTTP-triggered functions (e.g., a function that accepts HTTP requests and responds to them) is assigned a predefined URL by the URL coordinator 150. This URL is a forward link to a URL in a particular cloud. If a function is migrated from one cloud to another, the URL coordinator 150 will update a domain redirection table 155 to reflect this change on its redirection scheme.

In one or more embodiments, the URL coordinator 150 maintains the domain redirection table 155 as a database of registered domain names, and redirects all URLs created by public clouds for deployed functions (when applicable) to URLs created in these domains. URL redirection is especially important in some embodiments when deploying functions that act as Web services (e.g., that expect HTTP requests from end users and reply with HTTP responses). These functions therefore require URLs. When such a function is deployed directly to a public cloud, a given function will be assigned a URL characteristic to that cloud. For instance, if the function <appName>.<funcName> is deployed to different clouds, the given function will be assigned different URLs by the clouds:

In an Azure cloud, for example, the assigned URL may be:
https://<appName>.azureweb sites.net/api/<funcName>.
Likewise, in an exemplary Google Cloud Platform cloud, the assigned URL may be:
https://<region>-<appName>.cloudfunctions.net/<funcName>.

This URL naming scheme can be confusing. For example, an application with several functions spread among several clouds may end up with functions with very disparate URLs, creating an inconsistent naming schema. More importantly, with the function migration among Clouds disclosed by the present disclosure, when a function migrates from one cloud type to another cloud type, the assigned URL (if applicable) will change to the format of the target cloud. This is highly inconvenient, as the application end-users would ordinarily need to be notified about this change every time migrations occur.

The exemplary URL coordinator 150 addresses this scenario by doing the following, in one or more embodiments:
1) store a collection of pre-registered domain names (these domains can even be provided by the developers that are going to deploy their applications);
2) at deploy time, create a URL for newly deployed functions, using one of the registered domains in a fixed scheme. For instance:
http://<registered_domain>/appName/funcName;
3) redirect the cloud-assigned URLs to URLs created by the URL coordinator 150 (these URLs created by the URL coordinator 150 are referred to as forward links);
4) when a function is moved from one cloud to another, change the redirection scheme, so the forward link redirects the HTTP call to the cloud-assigned URL.

In this case, end users will refer to the URLs created by the URL coordinator 150, and end users do not need to know the URLs assigned to specific clouds. The URL redirection will happen transparently. There are a number of known methods for URL redirection, as would be apparent to a person of ordinary skill in the art.

The multi-cloud orchestrator 160 was described in U.S. patent application Ser. No. 16/171,554, referenced above, and is discussed further below in conjunction with FIG. 4. The exemplary multi-cloud orchestrator 160 communicates with the public clouds via their native APIs. Generally, the multi-cloud orchestrator 160:

accepts Application Registration requests from the deployer 140 and deploys the application;

monitors the application/services and collects monitoring data 170 according to predefined metrics;

moves functions among clouds according to optimization criteria;

adds, updates and removes functions from Applications as required; and removes applications from clouds as required.

In addition, the multi-cloud orchestrator 160 keep a structural state 165 of the multi-cloud application (e.g., for each application, which clouds contain which functions, at every moment in time), as discussed further below in conjunction with FIG. 2.

Figure 2:
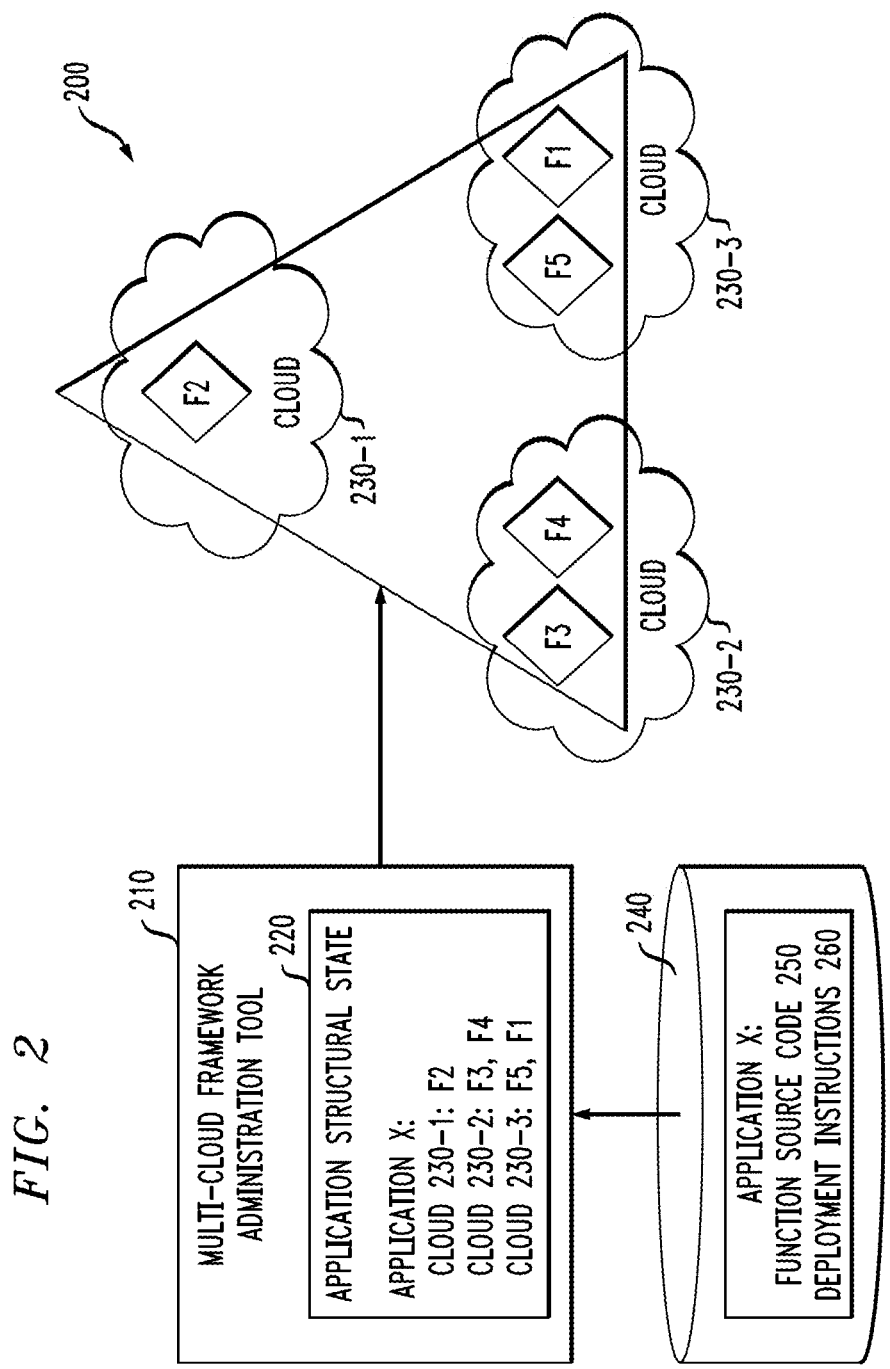
FIG. 2 illustrates an exemplary multi-cloud application environment where a function-based application is deployed, according to one embodiment of the disclosure.

FIG. 2 illustrates an exemplary multi-cloud application environment 200, according to one embodiment of the disclosure. As shown in FIG. 2, the exemplary multi-cloud application environment 200 comprises a multi-cloud framework administration tool 210 that maintains a structural state 220 for one or more applications, such as an application X. Application X comprises five functions, F1, F2, F3, F4 and F5 that run in three different cloud environments 230-1 through 230-3. In one or more embodiments, the application structural state 220 comprises an indication of the cloud environment 230-1 through 230-3 that hosts each function F1 through F5 of the application X, at a given point in time.

Thus, in the example of FIG. 2, cloud environment 230-1 hosts function F2, cloud environment 230-2 hosts functions F3 and F4, and cloud environment 230-3 hosts functions F5 and F 1.

In one or more embodiments, the multi-cloud framework administration tool 210 keeps the application structural state 220 up-to-date, as new functions are created or deleted on different cloud environments 230.

The disclosed multi-cloud framework allows for the use of multiple function types. In this manner, a user can initially decide to execute one or more function in a cloud environment 230 using a first function type and then decide to migrate the one or more functions to another cloud environment 230 using a different function type, as discussed further below. Some exemplary function types are discussed further below in conjunction with FIG. 3.

It is noted that the disclosed multi-cloud framework is optionally extensible and allows for the registering of other function types, as would be apparent to a person of ordinary skill in the art.

As shown in FIG. 2, the exemplary multi-cloud framework administration tool 210 accesses a data store such as a local or global repository 240 comprising a source code 250 for the plurality of functions of the application and deployment instructions (e.g., configuration files, if applicable) 260 for each of the plurality of distinct cloud environments 230-1 through 230-3. Generally, as discussed further below, the exemplary multi-cloud framework administration tool 210 deploys the plurality of functions F1 through F5 of the application X using the structural state 220 of the application, the source code 250 for the plurality of functions F1 through F5 and the deployment instructions (e.g., configuration files, if applicable) 260 for each of the plurality of distinct cloud environments 230.

In various embodiments, the application repository 240 could be any kind of structured data repository, ranging from a folder structure in the operating system file system to a full-fledged commercial Database Management System, depending on organizational concerns such as Information Technology infrastructure norms or security policies. It is important to notice, however, that for multi-cloud CI/CD to be in place, the application repository must be able to send notifications when the source code for functions registered in the system is modified.

Large companies that are already migrating or intend to migrate applications to the cloud are starting to look at multi-cloud environments as a means of budget savings and avoidance of vendor lock-in. Public clouds offer various services at different prices, and it would be desirable to use different clouds wisely, based on their price offers. At the same time, current industry trends in Cloud Computing point strongly to serverless computing, and cloud providers already provide serverless solutions, e.g., Azure Functions and/or Google Cloud Functions.

There is currently no product in the market, however, that can combine both approaches. In one or more embodiments, the disclosed multi-cloud techniques view applications as a composition of functions to be deployed in serverless cloud environments, and at the same time the functions can be easily migrated from one cloud to another, and this migration is based on cost (or other criteria defined by the users) of the functions.

U.S. patent application Ser. No. 16/171,554, referenced above, provided a step towards this multi-cloud serverless scenario, by providing an architecture that allows for deployment of function-based applications in multiple clouds and migration of functions among clouds. The present disclosure extends the teachings of U.S. patent application Ser. No. 16/171,554, to provide an end-to-end scenario where this architecture can be fully utilized in a Multi-Cloud Operations Center, with visible benefits for developers that employ it.

In one or more embodiments, a software architecture is provided to implement an operations center for multi-cloud function-based applications. Among other benefits, one or more new features are provided for multi-cloud environments, such as a single user account for use with multiple clouds, function mobility with seamless URL redirection for web-services, cloud transpilation and/or cloud-aware CI/CD.

As noted above, the deployer 140 of FIG. 1 accepts application registrations from developers, validates them and coordinates the deployment of these applications with the multi-cloud orchestrator 160. The deployer 140 comprises the cloud transpiler 145 that is responsible for creating configuration files for different types of services and different types of clouds, using predefined transpiler rules 148.

In some embodiments, the deployer 140 internally uses an HTTP Listener to process the application registrations. FIG. 3 illustrates an exemplary application registration request 300 sent by a developer to the deployer 140 of FIG. 1, according to at least one embodiment. As shown in FIG. 3, an exemplary application registration request sent by a developer comprises the following representative information:

developer identifier (granted during Developer User Account Creation);

application name;

application language/runtime (e.g., Jnode6, Python 3.5, etc.);

URL for the application source code; and list comprising name and type of each function and specific information about functions, if needed.

Once the deployer 140 checks that the user specified in the application registration request 300 is a valid user and that the specified application name does not yet exist, the deployer 140 passes the functions list to the cloud transpiler 145, so the cloud transpiler 145 will generate configuration code for different cloud types available in the system (e.g., Azure, GCP) and for different supported function types. Examples of function types can be:

HTTP-triggered functions, that respond to HTTP requests;

time-triggered functions, that must execute at a predefined time schedule; and storage-triggered functions, that must execute when some public cloud storage detects new data.

The cloud transpiler 145 analyzes the developer source code, generates the configuration files for different clouds and adds them to the source code before the application is effectively deployed to the different clouds.

After the cloud transpiler 145 has created the configuration files, the deployer 140 finally asks the multi-cloud orchestrator 160 to deploy the application, passing the source code address in the repository to the multi-cloud orchestrator 160.

As noted above, the exemplary multi-cloud orchestrator 160 deploys functions to the clouds and keeps a record of the structural state of all applications. The multi-cloud orchestrator 160 has a main component that exposes an API to end-users and deploys functions to different clouds using their native APIs.

Figure 4:
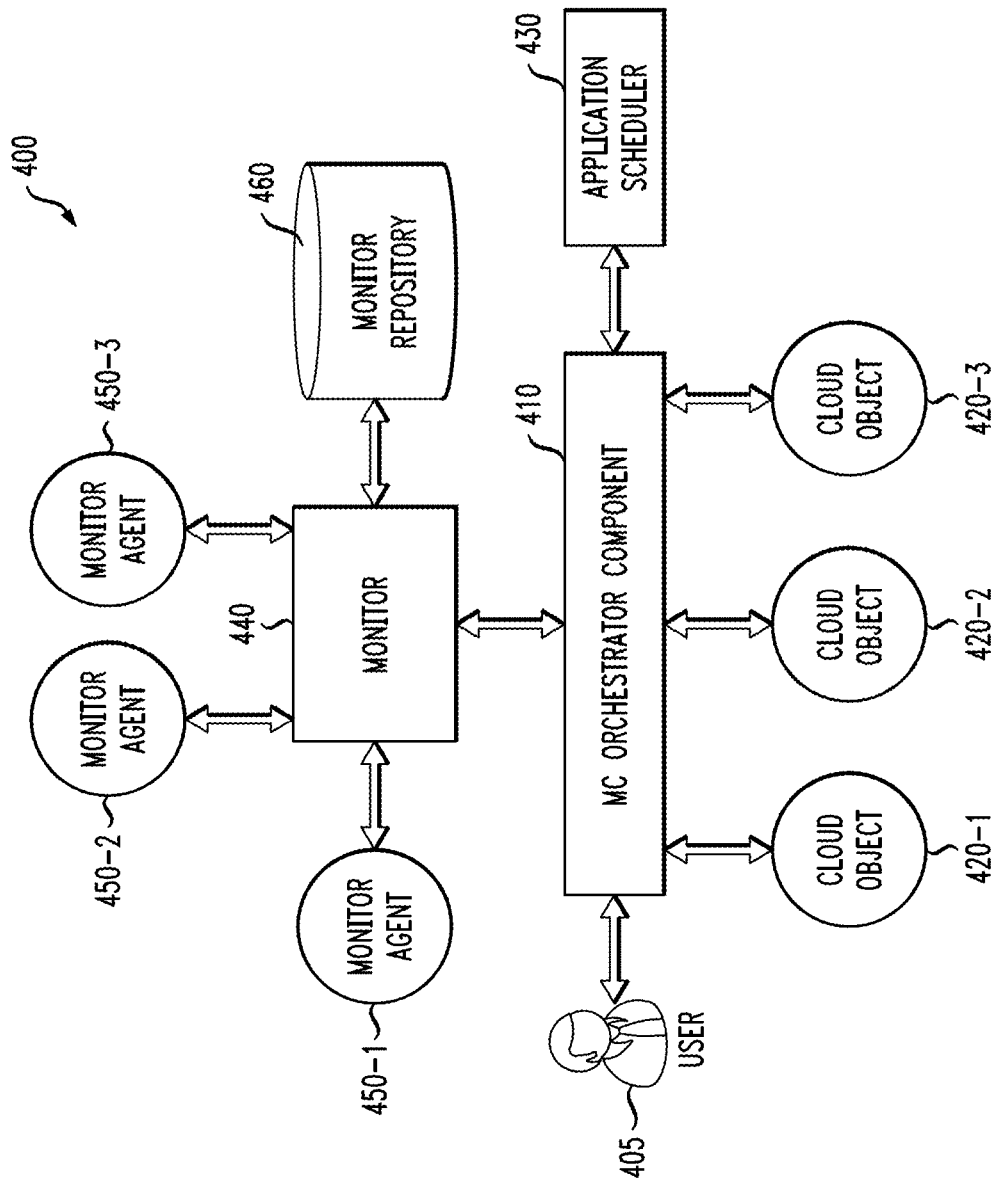
FIG. 4 illustrates an exemplary logical architecture for the disclosed multi-cloud orchestrator component of the framework, according to an embodiment.

FIG. 4 illustrates an exemplary logical architecture 400 for the disclosed multi-cloud framework, according to an embodiment. As shown in FIG. 4, the exemplary logical architecture 400 comprises a multi-cloud (MC) orchestrator component 410, an application scheduler 430 and a monitor 440.

The MC orchestrator component 410 is the main coordinator of the multi-cloud application environment 200 of FIG. 2. The MC orchestrator component 410 allows a user 405 to interact with the disclosed multi-cloud framework via standard operations so that the multi-cloud framework can provide three exemplary functionalities:

orchestration—keeping the coherence of the application among clouds 230, allowing for deployment, removal or relocation of functions;

resource monitoring—the MC orchestrator component 410 communicates with the monitor object 440, which in turn communicates with monitor agents 450-1 through 450-3 for different clouds, so as to collect user-defined metric values; and application scheduling—the MC orchestrator component 410 communicates with the application scheduler 430 so the application scheduler 430 can use data collected by the monitor 440 to calculate and suggest a move plan back to the MC orchestrator component 410.

One MC orchestrator component 410 can reside on a local desktop and will allow the cloud administrator to manage the multi-cloud application environment 200 of FIG. 2, with help of the other cloud objects depicted in FIG. 4.

In one or more embodiments the MC orchestrator component 410 stores a dictionary containing the structural state 220 of each application:

app_name

Dict<Cloud, Dict<Service,(active_version, List<Version>)>>

Each time a user calls an operation that is supposed to be performed on an application, the MC orchestrator component 410 uses this dictionary to know which clouds host which functions of that application, and in turn the MC orchestrator component 410 calls the cloud-specific objects to carry on operations specific to the services that each cloud hosts.

The MC orchestrator component 410 object also keeps the URL for the monitor 440 and the application scheduler 430, so the MC orchestrator component 410 can ask these two objects to execute operations related to Monitoring and Application Scheduling. The Monitor 440 and the Application Scheduler 430 reside in principle in the same device as the MC orchestrator component 410, but they can also reside on any cloud, as an alternative implementation, as would be apparent to a person of ordinary skill in the art.

Each cloud 230 can be classified according to a Cloud-Type and, for each cloud 230 that will be part of the multi-cloud application environment 200 of FIG. 2, there is a cloud object 420 running that corresponds to that Cloud-Type. These Cloud objects 420-1 through 420-3 can reside either in their respective Cloud or in the same device as the orchestrator 410—both implementations are possible. The cloud object 420 receives orders from the MC orchestrator component 410 and manages services in the Cloud 230 that the cloud object 420 is responsible for.

In one or more embodiments, there are different implementations of cloud objects 420, one for each supported CloudType. The various cloud objects 420 implement substantially the same list of operations in some embodiments (e.g., the same API that the orchestrator uses to communicate with them). The exemplary logical architecture 400 of FIG. 4 allows for the MC orchestrator component 410 to talk to all clouds 230 using a unified interface, and each cloud object 420 will use native cloud APIs (those of either public or on-premises clouds) to carry out the operations.

In a similar manner as cloud objects 420, each cloud (e.g., either public or on-premises clouds) should have a monitor agent object 450-1 through 450-3 running either on the respective cloud 230 or in the same device as the monitor object 440—both implementations are possible. The monitor agent object 450 is responsible for monitoring user-defined metrics related to functions that are allocated on one specific cloud and for sending the metrics data to a user-defined repository, which can optionally reside on the same cloud 230.

While different cloud objects 420 exist for different CloudTypes, different monitor agents 450 also exist for different CloudTypes, because they use the native-provided APIs to carry out their operations. In one or more embodiments, the different monitor agents 450 implement substantially the same API.

The monitor object 440 communicates with the different monitor agents 450 in order to order them to start or stop monitoring functions. The monitor object 440 receives monitoring reports from each monitor agent 450 responsible for monitoring clouds 230 and aggregates them in reports that are saved to a repository. This repository with aggregated data can be used to send monitoring reports to the MC orchestrator component 410 or the repository can be used by the application scheduler 430 to create move plans.

The monitor 440 keeps information about monitor agents 450, specifically which functions are being monitored by which monitor agents 450 in which cloud 230 and which metrics are being monitored for each function.

As shown in FIG. 4, a monitor repository 460 stores all measures sent by different clouds 230, and the monitor repository 460 organizes the measures in records with the following exemplary structure:

Application_name|service_name|Measure.

The application scheduler 430 uses the data accumulated in the monitor repository 460 used by the monitor 440 to analyze the accumulated data and create a move plan. It also allows the users to create Clots. A clot is a list of functions that cannot be moved separately. Either they are moved together or they do not take part in the move plan.

In some embodiments, the application scheduler 430 is a single object which optionally lives on the same site as the monitor repository 460.

While the MC orchestrator component 410, the application scheduler 430 and the monitor 440 are separate components in the exemplary logical architecture 400 of FIG. 4, other implementations are possible, as would be apparent to a person of ordinary skill in the art. Likewise, while the cloud objects 420 and monitor agent objects 450 are separate components in the exemplary logical architecture 400 of FIG. 4, other implementations are possible, as would be apparent to a person of ordinary skill in the art. The embodiment of FIG. 4 allows for scalability (each logical component being a separate executable code component). Moreover, the framework model can be extended to a model that accommodates multiple monitor objects 440 and application scheduler objects 430.

As noted above, the multi-cloud CI/CD 130 of FIG. 1 allows for Continuous Integration and Continuous Deployment in an environment where functions that compose an application are spread among multiple Clouds 230. The exemplary multi-cloud CI/CD 130 gets Change Notification messages (called Push Notifications) from the external source code repositories 135 and creates a list of instructions to be used by the MC Orchestrator 160 to update the clouds 230 according to these instructions.

In some embodiments, the exemplary multi-cloud CI/CD 130 is comprised of the following subcomponents:

1—an HTTP Listener that listens for Push Notifications (these messages are, for example, JSON packages, and different repositories can use different formats); and 2—a decoder that translates these Push Notifications in commit objects, and places them in a list of commit objects.

Figures 5, 6:
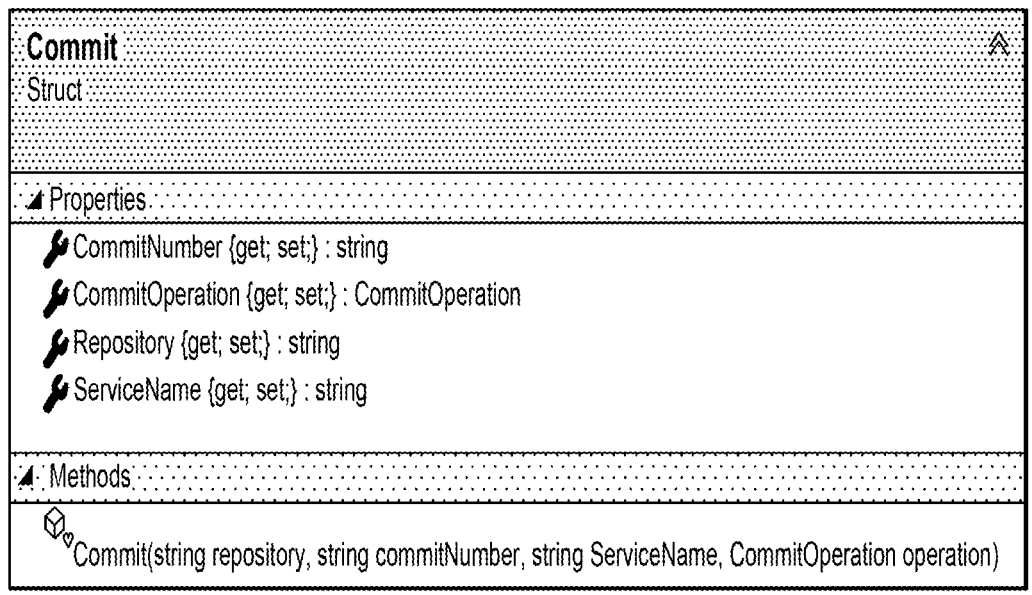
FIG. 5 illustrates an exemplary commit object containing a function name and an operation to be executed, according to at least one embodiment.
FIG. 6 illustrates exemplary function usage data extracted from cloud native application programming interfaces stored by the multi-cloud biller of FIG. 1, according to some embodiments.

FIG. 5 illustrates an exemplary Commit object 500 created by the multi-cloud CI/CD 130 of FIG. 1, to be used by the multi-cloud orchestrator 160 of FIG. 1, containing the function name (ServiceName) and the operation to be executed (CommitOperation), according to at least one embodiment.

The decoder of the multi-cloud CI/CD 130 works for different types of source code repositories 135, which can be public repositories (such as GitHub and GitLab) or even private, custom-made repositories, as long as they are capable of sending Push Notifications. To achieve such flexibility, in some embodiments, different design approaches can be made to ensure that multiple types can be supported by the multi-cloud operations center 100. For instance, one can use an object-oriented approach and create the decoder as an abstract class that must be derived for each repository type. In a further variation, the decoder can be created as a concrete class (for example, using C # programming techniques) with two delegate objects where users can dynamically specify the repository specific behavior, as would be apparent to a person of ordinary skill in the art. In this case, some important behaviors that these delegates deal with are:

PullCommit( )—a repository-specific method to pull changes from the Master repository to a local working area; and ConvertNotification(payload)—obtains a string from the HTTP Listener that corresponds to the payload of the Push Notification received from the External Source Repository 135 (different repositories will produce notifications with different formats) and generates a uniform list of Commit objects out of it.

As discussed above in conjunction with FIG. 1, the multi-cloud biller 120 deals with two types of billing: what the developers must pay to the multi-cloud operations center 100 and what the multi-cloud operations center 100 pays to the public clouds. Moreover, interfaces with commercial companies that deal with payment systems (e.g., credit card companies) to track whether bills are being paid or not.

The multi-cloud biller 120 maintains a billing records database 125 of billing information with billing data extracted from cloud native APIs and aggregates these data and creates several views of them.

In some embodiments, the multi-cloud biller 120 uses an HTTP Listener to extract internal billing information related to functions usage via cloud native billing APIs. For instance:

for Microsoft Azure: Azure Billing APIs provide programmatic access to Azure billing information and invoices; and for Google Cloud Platform: Cloud Billing API allows developers to manage billing for their projects programmatically.

The exemplary multi-cloud biller 120 extracts information from the public clouds about function usage and cost at regular intervals and stores the extracted information in the billing records database 125. Then, the multi-cloud biller 120 aggregates the data to provide the System Administrator automated, detailed information about how much each function/each cloud is costing the disclosed system.

FIG. 6 illustrates exemplary function usage data 600 extracted from cloud native APIs stored by the multi-cloud biller 120 of FIG. 1, according to some embodiments. It is noted that a system administrator can optionally create multiple subscriptions for one Cloud Type, although it is not necessary. Using this extracted information 600, the database 125 can provide the system administrator with consolidated data showing how much the proposed system owes to each Cloud. In one or more embodiments, the multi-cloud biller 120 uses the exemplary internal billing information of FIG. 6 and queries the multi-cloud orchestrator 160 about what application contains which functions, so that monthly developer bills can be provided to developers by (i) consolidating the costs per application (cost of its functions during the month), and (ii) applying administrations fees.

For instance, the multi-cloud biller 120 can query the multi-cloud orchestrator 160 to discover that Application A was composed of functions Func1 and FuncA on 20.02.02, and it can consolidate the cost of this application, so that the bill can be sent to the developer who owns this application.

It is important to note that the multi-cloud orchestrator 160 allows for migration of functions among clouds but may not store the history of function migrations. In one or more embodiments of the present disclosure, the multi-cloud orchestrator 160 optionally stores the function migration path as well, so that the multi-cloud orchestrator 160 can track changes such as "on day dd/mm/aaaa, function F1 moved from Cloud C1 to Cloud C2", or on "day dd/mm/aaaa, function F2 was deleted from Application App1".

Interaction Mechanisms

Configuring the System

As part of an initiation and configuration of the multi-cloud operations center 100, an administrator installs the components of FIG. 1 in a server. The installation comprises, for example, unzipping and starting the system components, and then setting aside a storage working area for its operations.

Once the components of FIG. 1 are physically installed and started in the server, the administrator must configure the system, by performing the following exemplary steps:
  register public clouds by creating accounts in all cloud types that will participate in the multi-cloud environment, and configure the multi-cloud operations center 100 with information needed to access those clouds programmatically (e.g., user account, credentials, etc.); and
  ask the URL coordinator 150 to register predefined domains in the domain redirection table 155.

Developer Account Creation

An exemplary flow of action in one or more embodiments comprise the following steps:
  developer sends a user registration request with his/her personal and billing information; and
  account administrator uses Account manager 110 to store the received data in its User Accounts database 115 and sends a confirmation to the developer, with credentials that allow him/her to register applications.

Application Registration

Once a Developer has a User Account, the steps for Application Registration follow:
  developer sends an application registration request with needed data about the application (see FIG. 3);
  deployer asks the multi-cloud orchestrator 160 if an application with suggested name already exists;
  deployer checks if source code path in the repository has the correct folder structure (see example in FIG. 7, discussed below);
  developer asks cloud transpiler 145 to generate cloud configuration files and add them to the source repository (see example in FIG. 8, discussed below);
  developer asks the multi-cloud orchestrator 160 to deploy new application given source repository path and request data;
  multi-cloud orchestrator 160 deploys new application to a chosen default cloud and sends a response with a list of deployed functions;
  deployer checks for HTTP-triggered functions among those deployed by the multi-cloud orchestrator 160 and asks the URL coordinator 150 for forward links to their native URLs; and
  deployer sends a response to developer with result (success/fail) and the forward links to native HTTP-triggered functions.

Figure 7:
FIG. 7 illustrates an exemplary original application source code folder structure created as part of a registration of an application, according to at least one embodiment of the disclosure.

FIG. 7 illustrates an exemplary original application source code folder structure 700 created as part of a registration of an application, according to at least one embodiment of the disclosure. As noted above, the deployer checks if the source code path in the repository has the correct folder structure 700.

Figure 8:
FIG. 8 illustrates an exemplary application source code folder structure after the cloud transpilation process, according to an embodiment.

FIG. 8 illustrates an exemplary application source code folder structure 800 after the cloud transpilation process, according to an embodiment. As shown in FIG. 8, folders have been added for each cloud configuration file, such as for Azure and GCP, in contrast to FIG. 7. As noted above, the developer asks the cloud transpiler 145 to generate cloud configuration files and add them to the source repository 700.

Cloud Transpilation

Different Cloud types may require functions to be written in different programming languages according to specific formatting rules for the particular cloud environment. These rules are, in most cases, related to function signatures and return values. For example, different parameters must be passed to different cloud environments. As shown in the example given by FIGS. 7 and 8, the same function (e.g., with the same functionality) was originally written for Microsoft Azure, but after Cloud Transpilation a version for Google Cloud Platform was added to it.

FIGS. 9 and 10 illustrate an exemplary function written in a nodeJS format 900 for Google Cloud Platform, and in a nodeJS format 1000 for Microsoft Azure. The specific function signature and return values (for each cloud environment, for example) are pointed out by the arrows 910/920 and 1010/1020, respectively. The Cloud Transpilation process can create a source code file from the Microsoft Azure type to the Google Cloud Platform type or vice-versa.

Moreover, it is possible that, for some cloud types and specific programming languages, a configuration file is still required to be provided so that the deployment in the cloud can be successful. Returning to the previous example, Microsoft Azure requires a configuration file named function.json to be deployed alongside with the function file; and there is no such requirement for Google Cloud Platform.

Figures 11, 12:
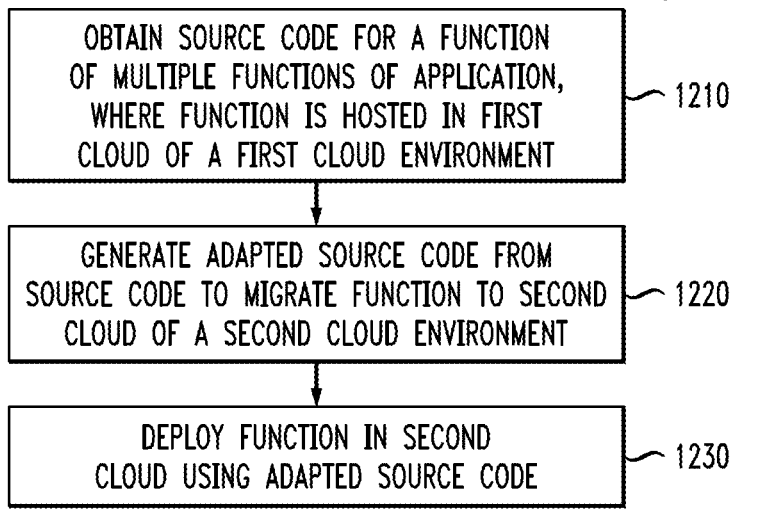
FIG. 11 illustrates an exemplary configuration file for a particular exemplary cloud environment, according to an embodiment.
FIG. 12 is a flow chart illustrating an exemplary implementation of a multi-cloud operations center process for function-based applications, according to one embodiment of the disclosure.

FIG. 11 illustrates an exemplary configuration file function.json 1100 specific to Microsoft Azure, related to the node JS format 1000 of FIG. 10 for Microsoft Azure.

Cloud transpilation allows a developer to write a function just once and the disclosed system will create appropriate versions for all needed cloud types (e.g., Microsoft Azure, GCP), as well as creating a configuration file whenever needed.

The transpilation process relies on the data sent by the application registration request 300 of FIG. 3 to carry out the following steps, in at least one embodiment:
  1—Function validation: The Cloud transpiler 145 checks if each function source file is a valid file. To be valid, the function source file must be syntactically correct according to its language specification;
  2—Function transpilation: If the function file was already written for a specific cloud type, the cloud transpiler 145 generates the source files for one or more additional cloud types supported by the disclosed system. If not, a cloud-specific source file is generated for all supported cloud types. The generated files in both cases are added to subfolders of the origin path; and
  3—Configuration generation: The disclosed system detects for which cloud type a configuration file is necessary, and then generates the needed configuration files and adds them to the same subfolders of its respective function files.

It is noted that mainstream languages in the Software Industry have language compilers implementations that can be used to validate the source code files for step 1.

For steps 2 and 3 to be executed, a set of pre-fixed transpiler rules that are specific to each combination of {clouds, languages, syntactic expressions} and that are relevant to the transpilation process are needed. For instance, a rule expressing a difference in a function signature between Google Cloud Platform and MS Azure could be:
  nodejs/
    GCP/$"module.exports. {1}=async function (req, res)
    {"
    Azure/$"module.exports=async function (context, {2})
    {"

On the other hand, a rule to generate a configuration file for that source file, to be used by Azure, could be:
  nodejs/
    {"disabled": false, "bindings": [
    {"authLevel": "anonymous", "type": "{1}", "direction": "in",
    "name": "{2}", "methods": ["get", "post"]}, {"type": "{3}", "direction": "out", "name": "{4}"}]}

In both examples, the parentheses with numbers inside (e.g., {1}, {2} etc.) are placeholders to be filled by parameters provided by the application registration request 300 of FIG. 3. It is noted that these examples are simply illustrations to show that the whole transpilation process can be performed, without regard to efficiency or completeness. There is a vast literature in the computer science field that deals with methods related to transpilation which vary from simple use of regular expressions to implementations of full-syntax aware transpilers. The discussion of such methods is out of the scope of this disclosure.

Code Deployment via CI/CD

For the disclosed multi-cloud operations center system to be able to apply CI/CD, developers working on a specific function-based application perform the following actions:

1. write source code in local desktops and commit the code to a master code repository. This master code repository can be a public Source Code Repository (such as GitHub) or a custom repository. This repository sends HTTP notifications to registered URLs when the function source files are added/updated/deleted by changes that the developer commits to it; and 2. when registering the application in the system, developers provide the system with the address to the application source code in this master repository.

In some embodiments, developers can switch ON and/or switch OFF CI/CD at any time in the multi-cloud operations center for function-based applications; internally, these commands translate to the system exposing or not exposing the list of commit objects (see FIG. 5) to the multi-cloud orchestrator 160.

The multi-cloud orchestrator 160 then uses this list of commits to perform the correct actions (add, update or delete functions) to the correct clouds 230, since it is the component that keeps a permanent record of the structural state 220 of all deployed applications. The multi-cloud orchestrator 160 consumes the list elements at its own pace.

With the configuration in place, every time a change on a function source code is committed to the master repository, it will send a push notification to the multi-cloud CI/CD 130 via HTTP and the system will reflect the change in the deployed application (e.g., update the function in the correct public cloud immediately).

Exemplary User Interface

A Web User Interface running in the disclosed multi-cloud operations center or a command-line user interface running in the user machine is suggested to facilitate the activities below. The functionality of the disclosed system is exposed to system users by the user interface.

Administrator:
Maintain basic CRUD (create, read, update and delete) operations for the user accounts database 115 and billing database 125;
Register clouds 230 that the disclosed system will utilize and their specific data;
Register and query the domain redirection table 155;
Monitor real-time application resource utilization and current costs—per application and per cloud (e.g., via Dashboards); and
All tasks developers can perform.

Developers:
Register themselves as users in the multi-cloud operations center;
Register applications and its functions;
Monitor resource utilization and current costs for their applications (e.g., via Dashboards); and Activate/Deactivate CI/CD.

FIG. 12 is a flow chart illustrating an exemplary implementation of a multi-cloud operations center process 1200 for function-based applications, according to one embodiment of the disclosure. As shown in FIG. 12, the exemplary multi-cloud operations center process 1200 initially obtains a first source code for at least one function of a plurality of functions of an application during step 1210. As described herein, the at least one function is hosted in a first cloud having a first cloud environment of a plurality of distinct cloud environments.

During step 1220, the exemplary multi-cloud operations center process 1200 generates adapted source code from the first source code for the at least one function to migrate the at least one function to a second cloud having a different cloud environment than the first cloud environment. Finally, the at least one function is deployed to the second cloud having the different cloud environment during step 1230 using the adapted source code.

Among other benefits, the disclosed multi-cloud operations center 100 allows a developer to have a single interface to interact with in order to deploy code to multiple clouds. The disclosed system generates configuration files for different clouds and function types, deploys the functions, updates the function via CI/CD and/or migrates functions among clouds according to pre-established optimization criteria (e.g., price or network utilization). Also, the developer optionally obtains a single periodic consolidated bill for the whole process.

In some embodiments, the disclosed multi-cloud operation center provides a computer system reachable via the Internet that is a single interaction place for developers to deploy function-based applications to multiple clouds. In the present disclosure, function-based applications are a composition of code fragments corresponding to individual functions that together contribute to realize the functionalities of an application; the multi-cloud operations center acts as a broker that deploys functions to multiple clouds on behalf of developers, which in turn need only have a user account registered in the operations center. Moreover, developers optionally get a single monthly, consolidated bill for resource utilization in all clouds where their application functions are hosted.

To fully realize the disclosed capabilities, the disclosed multi-cloud operations center for function-based applications also provides one or more of the following aspects for multi-cloud environments, such as:

function mobility with substantially seamless URL redirection for web-services: end users of such multi-cloud applications composed of web services do not use the actual web service URLs provided by the native clouds where they are installed. Rather, they use forward links that allow for seamless function mobility among clouds without the end users having to care about knowing new URLS if functions move from one cloud to another;

cloud transpilation: developers write code for functions only once, and the system generates adapted source code that will run in one or more additional different cloud environments (e.g., the automatically generated source code can either be function source code or configuration files);

cloud-aware CI/CD: updates in the source codebase reflect immediately in the deployed clouds (since the functions of an application can be scattered among multiple clouds, this mechanism makes sure that function updates are reflected in the appropriate clouds).

One or more embodiments of the disclosure provide improved methods, apparatus and computer program products for a multi-cloud operations center for function-based applications. The foregoing applications and associated embodiments should be considered as illustrative only, and numerous other embodiments can be configured using the techniques disclosed herein, in a wide variety of different applications.

It should also be understood that the disclosed multi-cloud techniques for function-based applications, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed multi-cloud techniques for function-based applications may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-cloud operations center 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based multi-cloud operations platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 13 and 14. These platforms may also be used to implement at least portions of other information processing systems in other embodiments.

Figure 13:
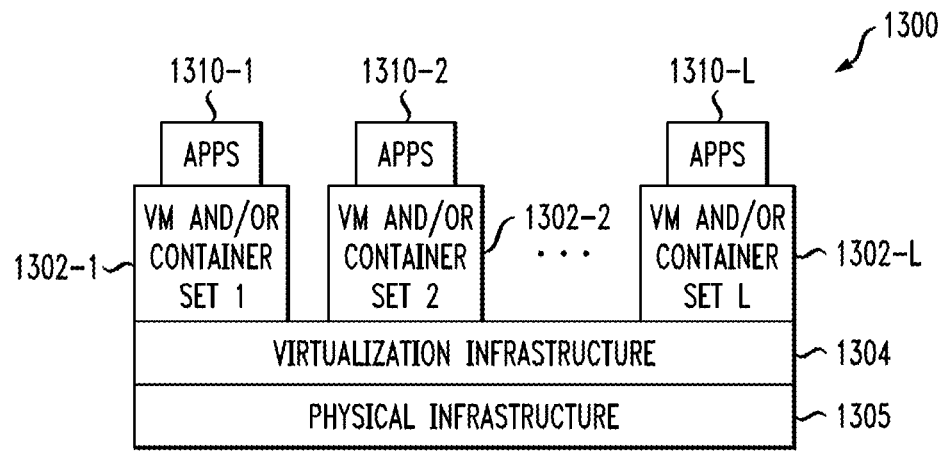
FIG. 13 illustrates an exemplary processing platform that may be used to implement at least a portion of one or more embodiments of the disclosure comprising a cloud infrastructure.

FIG. 13 shows an example processing platform comprising cloud infrastructure 1300. The cloud infrastructure 1300 comprises a combination of physical and virtual processing resources that may be utilized to implement at least a portion of the information processing system of the multi-cloud operations center 100. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. Such implementations can provide multi-cloud operations functionality of the type described above for one or more processes running on a given one of the VMs. For example, each of the VMs can implement multi-cloud control logic and associated source code adaptation for providing multi-cloud operations functionality for function-based applications for one or more processes running on that particular VM.

An example of a hypervisor platform that may be used to implement a hypervisor within the virtualization infrastructure 1304 is the VMware® vSphere® which may have an associated virtual infrastructure management system such as the VMware® vCenter™. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system. Such implementations can provide multi-cloud operations functionality for function-based applications of the type described above for one or more processes running on different ones of the containers. For example, a container host device supporting multiple containers of one or more container sets can implement one or more instances of multi-cloud control logic and associated source code adaptation for providing multi-cloud operations functionality for function-based applications.

As is apparent from the above, one or more of the processing modules or other components of the multi-cloud operations center 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises at least a portion of the given system and includes a plurality of processing devices, denoted 1402-1, 1402-2, 1402-3, . . . 1402-K, which communicate with one another over a network 1404. The network 1404 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1402-1 in the processing platform 1400 comprises a processor 1410 coupled to a memory 1412. The processor 1410 may comprise a microprocessor, a microcontroller, an application specific integrated circuit (ASIC), a field programmable gate array (FPGA) or other type of processing circuitry, as well as portions or combinations of such circuitry elements, and the memory 1412, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and the given system may include additional or alternative processing platforms, as well as numerous distinct processing platforms in any combination, with each such platform comprising one or more computers, storage devices or other processing devices.

Figure 14:
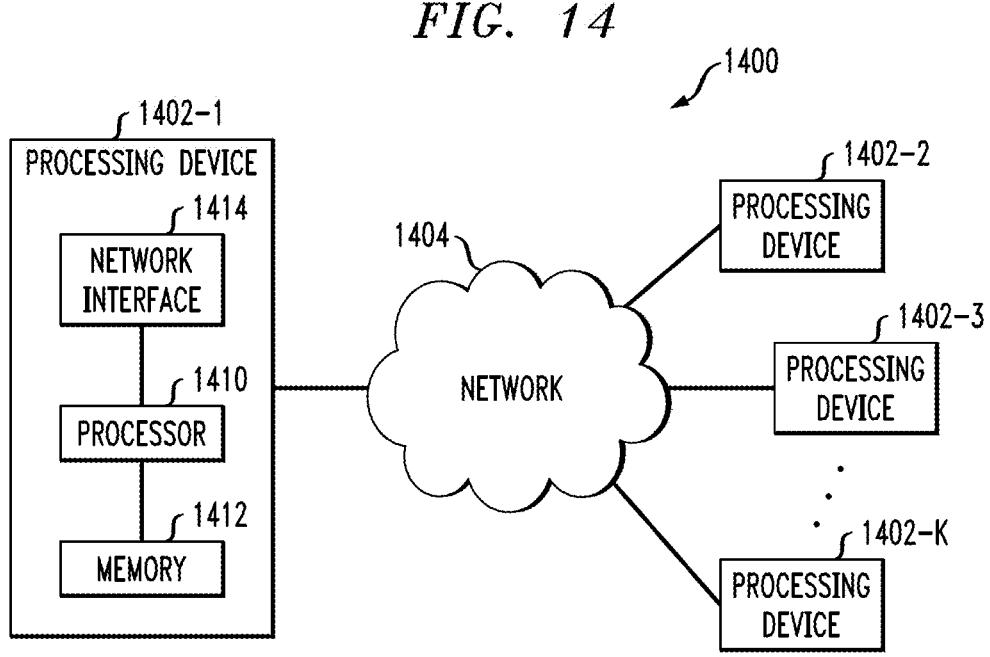
FIG. 14 illustrates another exemplary processing platform that may be used to implement at least a portion of one or more embodiments of the disclosure.

Multiple elements of an information processing system may be collectively implemented on a common processing platform of the type shown in FIG. 13 or 14, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, by a cloud orchestrator server, first source code for at least one function of a plurality of functions of an application, wherein the at least one function is hosted in a first cloud having a first cloud environment of a plurality of distinct cloud environments and has a corresponding network address that identifies the at least one function across the plurality of distinct cloud environments, wherein the cloud orchestrator server is configured to access each of the plurality of clouds using respective cloud accounts and to perform a network address redirection of the corresponding network address based on a given cloud environment on which the at least one function is currently deployed;
generating adapted source code from the first source code for the at least one function to migrate the at least one function to a second cloud having a different cloud environment than the first cloud environment;

deploying the at least one function to the second cloud having the different cloud environment using the adapted source code and the cloud account associated with the second cloud; and updating the network address redirection in response to said deploying, wherein the method is performed by at least one processing device comprising a processor coupled to a memory.

2. The method of claim 1, wherein the generating further generates a cloud-specific configuration file for the at least one function to migrate the at least one function to the different cloud environment.

3. The method of claim 1, further comprising evaluating the validity of the at least one function with respect to the cloud environment in which the at least one function is being deployed.

4. The method of claim 1, further comprising automatically updating the first source code for the at least one function for the plurality of the distinct cloud environments.

5. The method of claim 4, wherein the automatically updating comprises listening for push notifications from a source code repository indicating changes to the first source code of the at least one function and translating the push notifications into commit operations to update the first source code in the cloud environment in which the at least one function is deployed.

6. The method of claim 1, further comprising updating the network address redirection each time the at least one function is migrated to a new cloud environment.

7. The method of claim 1, further comprising querying a structural state of the application to obtain one or more of an identifier of one or more of the functions of the application, an identifier of one of the distinct cloud environments hosting one or more of the functions of the application, and an identifier of a version of one or more of the functions of the application.

8. The method of claim 1, wherein the first source code is associated with a user account that is managed by the cloud orchestrator server.

9. The method of claim 1, wherein the network address redirection redirects the corresponding network address to a network address assigned by the given cloud environment on which the at least one function is currently deployed.

10. A system, comprising:
a memory; and
at least one processing device, coupled to the memory, operative to implement the following steps:
obtaining, by a cloud orchestrator server, first source code for at least one function of a plurality of functions of an application, wherein the at least one function is hosted in a first cloud having a first cloud environment of a plurality of distinct cloud environments and has a corresponding network address that identifies the at least one function across the plurality of distinct cloud environments, wherein the cloud orchestrator server is configured to access each of the plurality of clouds using respective cloud accounts and to perform a network address redirection of the corresponding network address based on a given cloud environment on which the at least one function is currently deployed;
generating adapted source code from the first source code for the at least one function to migrate the at least one function to a second cloud having a different cloud environment than the first cloud environment;
deploying the at least one function to the second cloud having the different cloud environment using the adapted source code and the cloud account associated with the second cloud; and
updating the network address redirection in response to said deploying.

11. The system of claim 10, wherein the generating further generates a cloud-specific configuration file for the at least one function to migrate the at least one function to the different cloud environment.

12. The system of claim 10, wherein the steps further comprise evaluating the validity of the at least one function with respect to the cloud environment in which the at least one function is being deployed.

13. The system of claim 10, wherein the steps further comprise automatically updating the first source code for the at least one function for the plurality of the distinct cloud environments.

14. The system of claim 13, wherein the automatically updating comprises listening for push notifications from a first source code repository indicating changes to the first source code of the at least one function and translating the push notifications into commit operations to update the first source code in the cloud environment in which the at least one function is deployed.

15. The system of claim 10, wherein the network address redirection redirects the corresponding network address to a network address assigned by the given cloud environment on which the at least one function is currently deployed.

16. A computer program product, comprising a non-transitory machine-readable storage medium having encoded therein executable code of one or more software programs, wherein the one or more software programs when executed by at least one processing device perform the following steps:
obtaining, by a cloud orchestrator server, first source code for at least one function of a plurality of functions of an application, wherein the at least one function is hosted in a first cloud having a first cloud environment of a plurality of distinct cloud environments and has a corresponding network address that identifies the at least one function across the plurality of distinct cloud environments, wherein the cloud orchestrator server is configured to access each of the plurality of clouds using respective cloud accounts and to perform a network address redirection of the corresponding network address based on a given cloud environment on which the at least one function is currently deployed;
generating adapted source code from the first source code for the at least one function to migrate the at least one function to a second cloud having a different cloud environment than the first cloud environment;
deploying the at least one function to the second cloud having the different cloud environment using the adapted source code and the cloud account associated with the second cloud; and
updating the network address redirection in response to said deploying.

17. The computer program product of claim 16, wherein the generating further generates a cloud-specific configuration file for the at least one function to migrate the at least one function to the different cloud environment.

18. The computer program product of claim 13, wherein the steps further comprise evaluating the validity of the at least one function with respect to the cloud environment in which the at least one function is being deployed.

19. The computer program product of claim 16, wherein the steps further comprise automatically updating the first source code for the at least one function for the plurality of the distinct cloud environments.

20. The computer program product of claim 16, wherein the network address redirection redirects the corresponding network address to a network address assigned by the given cloud environment on which the at least one function is currently deployed.

\* \* \* \* \*

UNITED STATES PATENT AND TRADEMARK OFFICE
CERTIFICATE OF CORRECTION

PATENT NO. : 11,055,066 B2  
APPLICATION NO. : 16/554903  
DATED : July 6, 2021  
INVENTOR(S) : Jaumir Valenca Da Silveira Junior et al.

Page 1 of 1

It is certified that error appears in the above-identified patent and that said Letters Patent is hereby corrected as shown below:

In the Claims

Column 22, Line 62, Claim 18 reading "The computer program product of claim 13" should read --The computer program product of claim 16--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*